United States Patent
Wilson

(10) Patent No.: US 9,756,774 B1
(45) Date of Patent: Sep. 12, 2017

(54) AUTOMATIC IN FIELD VARIETY IDENTIFICATION

(71) Applicant: Ag Leader Technology, Inc., Ames, IA (US)

(72) Inventor: David Wilson, Ames, IA (US)

(73) Assignee: Ag Leader Technology, Inc., Ames, IA (US)

( * ) Notice: Subject to any disclaimer, the term of this patent is extended or adjusted under 35 U.S.C. 154(b) by 0 days.

(21) Appl. No.: 14/997,245

(22) Filed: Jan. 15, 2016

Related U.S. Application Data

(60) Provisional application No. 62/103,745, filed on Jan. 15, 2015.

(51) Int. Cl.
  *G06K 19/06* (2006.01)
  *A01C 1/00* (2006.01)
  *G06K 7/10* (2006.01)

(52) U.S. Cl.
  CPC ............ *A01C 1/00* (2013.01); *G06K 7/10366* (2013.01)

(58) Field of Classification Search
  CPC .. G06K 19/07749; G07F 7/1008; B42D 15/10
  USPC .................................................. 235/492, 487
  See application file for complete search history.

(56) References Cited

U.S. PATENT DOCUMENTS

| | | | |
|---|---|---|---|
| 6,141,614 A | 10/2000 | Janzen et al. | |
| 6,796,504 B2 * | 9/2004 | Robinson | B65G 65/005 235/375 |
| 7,162,328 B2 | 1/2007 | Hornbaker et al. | |
| 8,373,563 B2 | 2/2013 | Hyde et al. | |
| 8,810,406 B2 | 8/2014 | Sell | |
| 9,043,096 B2 | 5/2015 | Zielke et al. | |
| 2005/0103840 A1 | 5/2005 | Boles | |

OTHER PUBLICATIONS

Davenport, Christopher J., et al., "Biodegradable Passive RFID Tag for Subcutaneous Implant", Progress in Electromagnetics Research Symposium Abstracts, Guangzhou, China, Aug. 25-28, 2014, p. 1657.
Duroc, Yvan, et al., "RFID Potential Impacts and Future Evolution for Green Projects", Energy Procedia, vol. 18 (2012), pp. 91-98, available online at www.sciencedirect.com.

(Continued)

*Primary Examiner* — Karl D Frech
(74) *Attorney, Agent, or Firm* — McKee, Voorhees & Sease, PLC

(57) ABSTRACT

A system, method, and apparatus for automatically gathering seed-specific data for an agricultural crop. Simulated seeds with contactless machine-readable data are co-mingled with actual seeds. Whether in stored form prior to planting, during planting, or after planting with the actual seed in the ground, appropriate readers can quickly and accurately read the seed-specific data for a variety of purposes. That can include simply confirming that the actual seed at least in proximity to a simulated seed is of a particular hybrid or variety. It could also include other seed-specific data such as time and date of planning, seed production company, seed-specific usage restrictions, etc. The data can be utilized by other systems. One example would be a precision agricultural system.

30 Claims, 8 Drawing Sheets

(56) References Cited

OTHER PUBLICATIONS

Alien ALH-9011 Handheld RFID Reader, Datasheet [online], atlasRFIDstore, 2015 [retrieved on Jan. 15, 2015], Retrieved from the Internet: <URL:www.atlasrfidstore.com/alien-alh-9011-handheld-rfid-reader.html>, 3 pages.

Internet Website Screen Shots From HID Global Company of Austin, TX (USA), 2015 [retrieved on Jan. 15, 2015], Retrieved from the Internet: <URL:www.hidglobal.com/products/rfid-tags/identification-technologies.html>, 2 pages.

* cited by examiner

RFID DATA

- SEED HYBRID OR VARIETY ID
- LOT #
- MATURITY
- HERBICIDE TRAITS
- INSECTICIDE TRAITS
- DISEASE LEVELS
- REFUSE LEVELS
- GDU
- DATE/TIME PLANTED
- ETC.
- 
- 
-

AUTOMATIC IN FIELD VARIETY IDENTIFICATION

CROSS-REFERENCE TO RELATED APPLICATIONS

This application claims the benefit of Provisional Application U.S. Ser. No. 62/103,745 filed on Jan. 15, 2015, all of which is herein incorporated by reference in its entirety.

BACKGROUND OF THE INVENTION

A. Field of the Invention

This invention relates to agricultural and, in particular, to automatic identification of seed-specific information about agricultural seeds, including prior to planting, during planting, and after planting.

B. Problems in the Art

Precision agriculture continues to advance. Likewise does utilization of more and more data regarding the entire process. More information about each stage of agricultural production can be beneficial to a variety of stakeholders, including the farmer/producer. However, like any data collection and processing system, accuracy is critical. One example is being able to identify seed or plant variety or hybrid accurately and efficiently.

Advances in plant science, including plant breeding and genetic modification, has led to an explosion of different varieties or hybrids to meet different producer goals or environmental conditions. The ability to accurately know and monitor specific seed or plant hybrid or variety is important to not only knowing what is going to be planted, but also what is planted in the ground. Furthermore it is important to making future decisions about the next growing season or seasons. However, as will be demonstrated below, keeping track of seed- or plant-specific information, even for sets of seed or plants, is not a trivial endeavor.

For example, seed customers (e.g. farmers/producers) often forget when they add more seed to a planter that it may be a different hybrid than originally planted and, therefore, they can forget to change the identification of the hybrid in, for example, a precision agriculture system they are using. This causes the farmers to log incorrect data and make poor management decisions because of the incorrect hybrid being logged. For example, the producer might choose variety X for next year's planting season because it was believed to have yielded better, but it was really variety Y that was planted.

Furthermore, even if the farmer remembers to change the hybrid logging at seed switch-over during planting, there is always the risk of human error in the entry of that information into the system. Such potential errors can occur at other points in the agricultural production cycle. Seed company representatives rely on the farmer to tell them what hybrid was planted in which fields. If such a trusted advisor is told it is seed X when it really is not, this can cause confusion, unnecessary work, and poor management decisions.

Another example is the step of recording of hybrid or variety type, or other information about seed or a crop from the seed. Such tracking and documentation can take many forms. It can range from keeping the labels off of seed bags or other packaging, to handwriting information into a notebook, to manual entry into the computerized precision farming system. In all these cases risk of human error exists.

A still further example is user overhead. Although a subtle burden, manual entry of seed-specific data at even one point or stage of agricultural production (e.g. when re-loading a planter) takes valuable time. Cumulatively, over all planting for a season, it can add up and impact productivity.

Therefore, there is a need for improvement in being able to automatically identify seed or plant variety or hybrid type, and/or other seed-specific information, that is accurate, efficient, immediate, and practical, not only at the planting stage but at other stages of production.

There are known ways to identify plant-specific information. Many tend to be high technology ways to identify plant genotype. Some examples are destructive in the sense they remove seed or plant tissue and investigate it in a laboratory setting. This might be reasonable for some limited research settings or for seed production companies, but not for farmers. Sophisticated techniques such as aerial-based spectrometry can be used to try to identify plant genotype for plants growing in the field. But it is difficult to have resolution down to row-by-row or plant-by-plant with such techniques. They are complex, costly, and can only work for growing plants and not seed.

There have been attempts to use Automated Identification and Data Capture (AIDC) to allow machine-readable data to be associated with seeds or plants. One example is bar codes. However, they require unobstructed line-of-sight for the reader and maintenance of the UPC graphics. It is sometimes difficult to accurately read bar codes when the bar code or the reader is moving. All this makes it difficult to use bar codes with seeds or agricultural production. In particular, it represents limitations on the degree to which a bar code can follow and be correlated to other than seed packages, as opposed to seed throughout the production process from packaging, to planting, to harvest.

The assignee of the present application has invented and patented a technique of tracking harvested crops, including grain crops like corn and soybeans. See U.S. Pat. No. 8,810,406 to inventor Sell and owned by Ag Leader Technology, In., Ames, Iowa (USA), which is incorporated by reference herein. Objects with RFID tags are added to the harvested grain flow. The RFID tags are both readable and writeable to add specific information about the grain as it is harvested. Traceability of such grain is made possible by using RFID scanners or readers to interrogate the grain with the inserted RFID tagged objects, or a portion of it. This can be on-board the harvester, in a wagon or hopper to transport the grain, or at a storage facility. The user makes the assumption that harvested grain in close proximity to the objects with RFID tags correlate to the grain specific data written in the RFID tag. The objects with the RFID tags can be manufactured to simulate the form factor and other characteristics of the actual grain being harvested so that they tend to stay dispersed and react to post-harvest processing in a similar manner to the actual grain. See also, U.S. Pat. No. 7,162,328 to inventors Hornbaker et al. and assigned to the University of Illinois, also incorporated by reference herein. It also relates to tracking grain after harvest using RFID tagged objects mixed into the harvested grain. In both these patents, a bulk quantity of RFID tagged objects has to be carried on-board a harvester and then metered into a bulk quantity of actual harvested grain. Also, the systems require components to automatically remove or filter out the RFID tagged objects at some point from the actual grain.

Providing seed-specific data for seed to be planted presents a different set of issues. Some of them are antagonistic to each other. For example, seed for planting is usually produced by an entity other than the farmer. It is typically bagged or packaged prior to delivery. There can be significantly different information about seed, not only its variety or hybrid but usage restrictions. It must be removed from packaging and go through quite precise handling at the planter. And it must then be placed in the ground, outside of any packaging, implements, or containers so that it can grow. These factors present a different set of competing factors to keep correlation of actual seed to readable data about such seed than handling of bulk harvested grain. Introduction of foreign or non-seed into the process is contra-indicated.

Therefore, the inventor has identified room for improvement in this technological area.

SUMMARY OF THE INVENTION

A. Objects of the Invention

It is therefore principal object, feature, aspect, or advantage of the present invention to provide a system, method, and apparatus which improve over or solve problems and deficiencies in this art.

Further objects, features, aspects, or advantages of the invention include a system, method, or apparatus which:
  a. provides faster and more resource-efficient acquisition of hybrid variety identification of or other information about seeds or plants, prior to planting, during planting, and while growing in the field, including during other field operations up until the grain is harvested;
  b. promotes reduction of human error in recording and retrieving such identification or other information;
  c. is practical and economical, including for agricultural producers;
  d. integrates with sophisticated precision agricultural digital systems or less sophisticated systems;
  e. can be implemented at seed packaging in preparation for planting, during planting, and also after the seeds have been planted in the field;
  f. provides substantial flexibility to extend data beyond simply hybrid or variety identification to other seed-specific information;
  g. can be applied to a variety of seed types;
  h. can be utilized not only in identification of seeds or plants but also in helping subsequent agricultural processes or planning related to the seed or plants, fields, or overall farmer production plans for the future.

These and other objects, features, aspects, advantages of the invention will become more apparent with reference to the accompanying specification and claims.

B. Aspects of the Invention

One aspect of the invention relates to co-mingling simulated seeds carrying contactless machine-readable data about a hybrid or variety with actual plantable seeds of that hybrid or variety. This allows automatic identification of the hybrid or variety, or other information about the seed, whether stored in a package pre-planting, during the planting process, and even after the seeds are planted in the ground and growing into plants. A relevant data reader can pick up the data and either use it at the reader or transmit it to other systems, including a precision farming system, a remote computer or server, or to cloud-based storage for subsequent retrieval and use. The proximity of the simulated, data-carrying seeds to the actual seeds allows the correlation of identity.

Another aspect of the invention comprises a system which includes the co-mingled actual and simulated seeds in combination with an automatic reader that can read hybrid or variety identification in a contactless manner within a range of stand-off distances determined by characteristics of the simulated seeds and the reader, wherever those simulated seeds are. This includes in packaging or storage, during planting, or once in the ground.

Another aspect of the invention is simulated seeds, as above described, which are pre-programmed with specific data within their data storage capacity. Such pre-programmed information can include seed variety or hybrid type, or other seed-specific information relative to a set or quantity of actual seed. It could also include individual identification of each machine-readable simulated seed such that, if needed or desired, individual resolution of information on a simulated seed-by-seed basis could be made. Other information, within the storage capacity of the simulated seed, is possible.

Another aspect of the invention utilizes a machine-readable simulated seed carrying data that can be read with a contactless reader but also includes the ability to write data to the simulated seed. This allows adding or updating data correlated to that simulated seed at various, times, locations, or stages of agricultural production cycle.

Another aspect of the invention comprises utilizing or integrating a mixture of co-mingled actual seed and machine-readable simulated seeds with other equipment in the agricultural production process. One example is making the form factor of the simulated seed, and its other characteristics, as analogous to the actual seed as possible so that it will essentially be handled like actual seeds by seed-handling equipment related to crop production. This allows simulated seeds to progress through, for example, a planting process without disruption of that planting process other than taking a growing position in the field. The designer can statistically select the ratio of number of simulated seeds to actual seeds in the mixture of seeds to be planted to balance such things as cost of simulated seeds and reduced yield from the simulated seeds taking growing positions in the field, versus the benefits of time-saving, accuracy, and/or amount of resolution of readable information about the seeds once planted in a field.

Further aspects include utilizing readers at various locations in a planter set-up. This gives flexibility as far as where and how the automated reading occurs. Other equipment like sprayers, cultivators, fertilizer applicators, and harvesters could include at least one reader to assist in such things as verifying identification of the seed or plants growing from the actual seed when actions subsequent to planting occur. This can also allow confirmation of correct or desired operations on the plants such as correct herbicide, insecticide, or fertilizer for a given plant hybrid or variety. It can include identifying harvested plant variety or hybrid for record-keeping or future planning purposes.

A further aspect of the invention comprises integrating the readable data from the simulated seed with other digital systems for a variety of purposes ranging from simply immediate and fast seed- or plant-specific identification or information purposes, to record-keeping or making decisions about operations on the seed or plants during a growing season or for future production purposes. This can include integration into any number of precision farming or agricultural digital systems.

A further aspect of the invention is to utilize a statistically-designed proportion of simulated seeds versus actual seeds in a planting application and then using appropriate readers to help map the planted field. This can allow not only row-by-row, but in some cases, close to plant-by-plant specific readable information, even after the seed is planted in the field and plants from the seed are growing. Specific seed or plant information for locations throughout a field can be used for a variety of beneficial reasons. Such information can be utilized with other mapping data to help agricultural producers manage that year's crop in that field as well as future decisions about the type of seed or crop for that field.

Further aspects of the invention include methods of identifying, quickly and accurately, seed or plant hybrid or variety or other information. Contactless machine-readable data acquisition can be utilized in managing a given year's production or future years. RFID technology is one form of contactless machine-readable data acquisition that can be utilized.

Another aspect of the invention comprises utilizing simulated seeds, as above-described, in agricultural production with one or more readers placed at designed positions that can vary. Automatic reading of seed-specific data at one or more stages or locations relative to the seed can be available throughout the production cycle, including after the actual seeds are planted in the field because of their proximity to the readable simulated seed.

BRIEF DESCRIPTION OF THE DRAWINGS

FIG. 1 furthermore shows in dashed lines the ability to operatively communicate, connect, or otherwise integrate the read data with other systems, including but not limited to a precision farming system for further use.

DETAILED DESCRIPTION OF EXEMPLARY EMBODIMENTS

A. Overview

Figure 1:
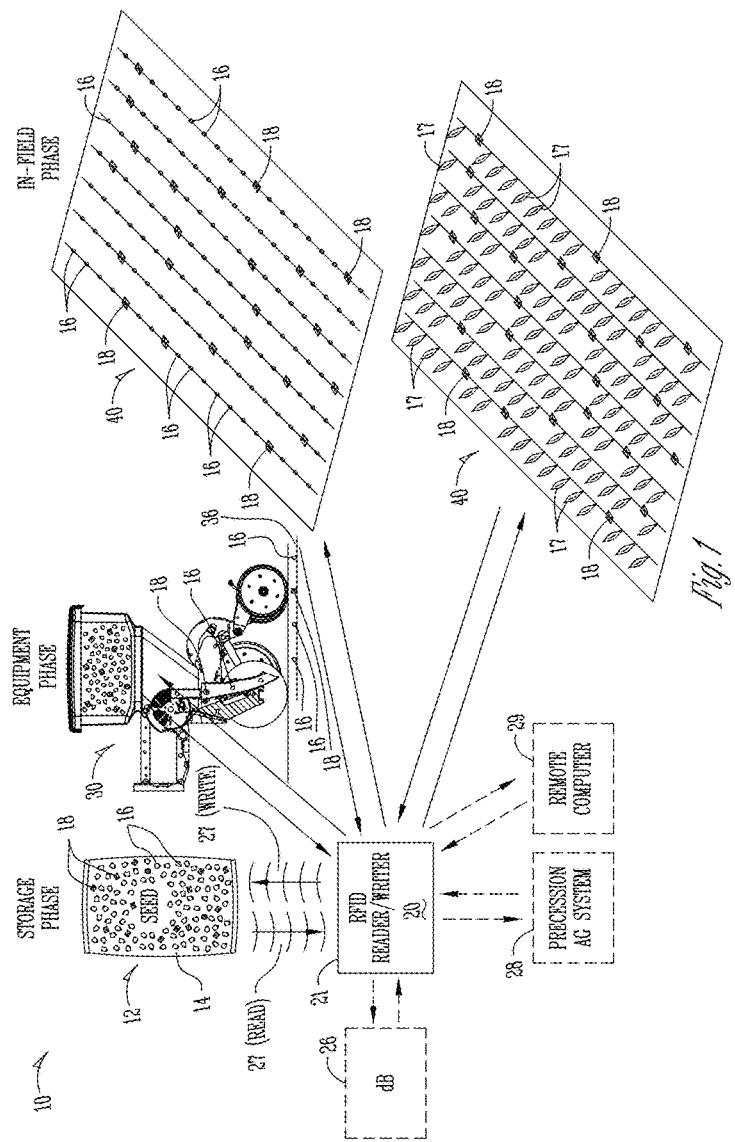
FIG. 1 is a diagrammatic view of a mixture of co-mingled actual and simulated seeds carrying contactless machine-readable data relative to different stages of agricultural production, namely from bagging or packaging, to during planting, to after planting including growing plants from the actual seeds in the field, including illustrating how an appropriate contactless reader can read the data of the simulated seeds at any of those stages.

For better understanding of the invention, several examples of specific implementations of the invention will now be described in detail. It is to be understood these are neither exclusive nor inclusive of all forms or embodiments the invention can take. Variations obvious to those skilled in the art will be included within the invention, which is defined by the appended claims.

Most of the context of the following descriptions will be with regard to planting a field with corn as the agricultural crop. It is to be understood the invention can be applied in analogous ways to other seeds.

Frequent reference will be made to the drawings, which are summarized above. Reference numerals or letters will be used to indicate certain parts and locations in the drawings. The same reference numbers or letters will be used to indicate the same or similar parts or locations throughout the drawings unless otherwise indicated.

B. Overall System General Description

With reference primarily to FIG. 1, an overall system according to one embodiment of the invention is illustrated.

Overall system 10 in this embodiment includes:
a. A pre-determined mixture of co-mingled actual seeds and simulated seeds (collectively designated by reference numeral 12). Typically the mixture of seed 12 is pre-packaged in a container or packaging 14 by a seed production company. In this example, the actual seed are one type of corn variety or hybrid. The simulated seed are objects of similar form factor to corn seed and carrying an RFID tag on which is stored the machine-readable data.
b. A data reader 20 compatible with the RFID tags and data of the simulated seed. Reader 20 can be used alone to read the simulated seed data from within operative range of the reader and tags. It optionally can be configured to communicate with other devices, as will be discussed below. It is typical, at least with RFID readers that they can both read and write data relative the machine-readable device (e.g. RFID chip or tag). Whenever the term "reader" is used herein it will be understood to include at least the read function and could include read and write functionality.

The co-mingled set of seed 12 includes a quantity of actual seed 16 and a quantity of simulated seed 18. In FIG. 1, as well as other figures, for diagrammatic purposes only actual seed 16 are distinguished by the "X" symbol on each individual simulated seed 18. Furthermore, for clarity, the size of actual seed 16 or simulate seed 18 versus package 14 is not to scale, nor is the typical number of either actual seed 16 or simulated seed 18 per container 14. As is well-known in the art, typical corn seed bags contain on the order of 80,000 kernels.

Each simulated seed 18 carries machine-readable data. In this embodiment this comprises an RFID tag. Other types of contactless machine-readable automatic identification and data capture (AIDC) techniques are possible.

In this embodiment, plural RFID-tagged simulated seed are in each pre-packaged quantity 12. However, the number can vary including from just one to any ratio. However, generally, it will be more than one simulated seed 18 per mixture 12, but substantial minority of the overall number of actual seeds 16.

System 10 includes utilization of a reader 12. While the invention is not limited necessarily to this technique, in this embodiment reader 20 is an RFID reader such as is known in the art and commercially available. Discussion of examples and operation of such readers can be found at U.S. Pat. Nos. 7,162,328 and 8,810,406, referenced above. Simulated seed 18 have form factors that mimic the actual seed 16 but include an RFID tag.

RFID readers come in a variety of sizes and capabilities. Some are of relatively small size (e.g. less than 1 ft$^2$). Since they rely on wireless radio energy for communication to RFID tags, they can be packaged in robust and even ruggedized fashion appropriate for operating in a variety of conditions (e.g. outdoors environment temperature extremes, precipitation, dirt/debris/dust, etc.) and survive typical forces (e.g. vibration, noise, etc.). Therefore, reader 20 can be configured for operational mounting in a wide-variety of positions relative to seed packages 14 or where mixture 12 ends up, or on different agricultural equipment or other vehicles.

In this manner, system 10 would allow a contactless machine-reading of simulated seed in a mixture 12 at any of various stages of agricultural production. By using RFID chips in simulated seed form factors, reading can be from stand-off distances from adjacent to, centimeters away, and even (under the right conditions and components) a meter or meters away. Furthermore, since RFID reading does not require line-of-sight or contact (both reader and transponded signal from RFID tag are basically broadcast omni-directionally), in-range reading can occur without precise aiming or positioning as well as through barriers such as packaging, equipment, and soil.

Below is further discussion of components of system 10.

1. In Seed Package or Container

As indicated in FIG. 1, the contents of seed bag 14 could be scanned with reader 20 wherever bag 14 might be, if within range of reader 20. This could be at a seed production company location. It could be at a seed sales storage location. It could be at a farmer's farm, either in storage, in transport to a field, or when waiting at the field for use in planting.

Simulated seeds 18 in each bag 14 could be preprogrammed with at least an identification of variety or hybrid type for the actual seeds in bag 14. Thus, the operator of reader 20 would be able to automatically, nondestructively, and in a contactless manner accurately poll or interrogate any package 14 for fast, accurate variety or hybrid identification, even without reference to any labeling or indicia on the packaging.

As illustrated in FIG. 1, this could allow automatic verification of the contents of the packaging 14 at a storage location, when transporting package 14 to a planning location, and at the time of emptying the contents of package 14 into a planter. It would be quick and accurate, with minimum expenditure of time.

2. At a Planter

FIG. 1 also shows the system 10 could include use during transfer of the co-mingled seed 12 into an agricultural implement. One implement is a planter 30. Reader 20, by appropriate positioning, could read data from the simulated seed in bag 14 prior to being added to the planter. This allows automatic verification and recording of seed type, including when type is changed in the same field or planting session.

But further, as indicated in FIG. 1, because the readable data is carried on individual simulated seed within bag 14, the data can be read even after contents 12 of bag 14 is poured out of bag 14 into planter 30. Because machine-readable simulated seed 18 is co-mingled with actual seed 16, interrogating the planter with reader 20 allows the assumption that the read data applies to the actual seed in proximity to the simulated seed now in the planter. One advantage of system 10 is that the reading can be done when the mixture 12 is static (e.g. sitting in a seed hopper on the planter) as well as when the mixture, or a portion of it, is moving in the planter (e.g. pulled from the hopper to a seed meter, working through the seed meter, or travelling down the seed tube for deposit in the furrow in the field). The co-mingling allows the assumption that the actual seed in proximity with a simulated seed relate to the data carried on the simulated seed.

3. After Planting

FIG. 1 also shows an important feature. System 10 can also be used to interrogate a planted field. Because simulated seeds 18 in this embodiment mimic actual seeds 16, planter 30 will process them like actual seed. Simulated seed 18 will move from bulk on-board storage (e.g. in a seed hopper or in a seed box), be singulated (e.g. by a seed meter), and then sent to the furrow in whatever serial order they happen to be relative actual seed 16. While, once planted, each simulated seed 18 therefore occupies what would otherwise be an actual seed location in the ground (and as a result no plant will emerge for those locations), this places simulated seed 18 in proximity to actual seed 16 from the mixture 12 in field 40. A reader scanning any part of field 40 will allow the assumption that actual seed, at least in close proximity to the simulated seed which has been read, correlates to the data read from such simulated seed.

Thus, the contactless use of reader 20 allows quick, essentially real-time, accurate identification of what is planted in the field by correlation with the data carried on the simulated seeds 18 that would also be planted in proximity to the other plant locations in the field.

As will be understood, the ratio of simulated seed 18 to actual seed 16 in a mixture 12 will substantially control the degree of resolution of seed-specific data once planted. For example, if the ratio was essentially 1:1, statistically (with perhaps some intentional steps to promote good distribution of simulated seed 18 through bag 14), almost seed-by-seed resolution would be possible because every other actual seed would, on average, have a simulated seed adjacent to it. However, as will be appreciated, this could add significant cost to each mixture 12 and substantially reduce yield for a field if every other possible plant location is instead occupied by a simulated seed from which there is no chance of a plant emerging.

Therefore, as discussed further below, the designer likely would use a smaller ratio of simulated to actual seed. Although one simulated seed per bag 14 is possible, this would greatly reduce resolution. It could also make it more difficult to sense or read the in-ground simulated seeds across a field. It would also make more difficult assumptions when scanning a field that certain actual seeds (or plants from those actual seeds) correlate to a certain bag 14 of seed. The proximity of some of the actual seed from one bag to a single simulated seed could be many meters away and even in a different row. This also would present issues when seed mixtures 12 are changed in the same field.

Thus, the designer would balance different factors (e.g. cost of RFIDs and simulated seed, reduction in yield, etc. versus benefits of higher information resolution) when setting a ratio.

FIG. 1 shows another important and somewhat subtle advantage of the present embodiment. By allowing simulated machine-readable seed to be planted like actual seed, once plants from actual seed 16 are growing (see reference numeral 17), a reader 20 can still be used to scan the field and obtain information about those plants. Their proximity to the in-ground, planted simulated seed 18 (which of course would not produce a plant) allows extrapolation that plants 17 in proximity to a read simulated seed 18 can be correlated to the data (e.g. the hybrid or variety) identified by reading this simulated seed 18. Some advantages of RFID as the mode of AIDC are: (a) the RFID tags of the simulated seed do not have to be visible and typically can have barriers between them and the reader (e.g. the bag wall, planter component walls, and soil); (b) reading typically does not have to be line-of-sight, (c) broadcast signals do not require precise directional aiming, and (d) passive RFID tags do not need their own power source. Furthermore, many types of RFID tags can be very robust and ruggedized relative to sometimes harsh conditions of temperature, moisture, vibration, noise, dirt, etc. involved with agricultural production.

It can therefore be appreciated that system 10 allows high flexibility and beneficial collection of at least seed or plant hybrid or variety identification throughout an agricultural production cycle. Because it is easy to write to RFID chips, other seed specific information can be easily added by techniques well-known in the RFID art either prior to bagging the seed or at any stage described above. See, e.g., U.S. Pat. Nos. 7,162,328 and 8,373,563, referenced above.

4. Optional System Features

FIG. 1 further shows optional features of the embodiment. Reader 20 can have a variety of internal or related operational circuitry and functions 21. This could include storing read data to an on-board database 26. Alternatively that data could be communicated wirelessly to remote device or storage location. Commercially-available RF readers typically have such capabilities. See, e.g., model ALH-9011 RFID reader from Alien Technology Corporation, San Jose, Calif. (USA). Details can be found at http://www.atlasrfidstore.com/alien-alh-9011-handlheld-rfid-reader/. Because of form factor size limits for simulated seed, it is likely that the RFID tag would be a passive tag.

Optionally reader 20 could include the functionality of read and write (reference number 27). As is well-known in the RFID art, this can be accomplished by reader 20. As will be described further, this could allow a user to not only read pre-programmed information from the simulated seed, but also add or change information carried on the simulated seed. Such read/write technology is known in the RFID art. See, for example, U.S. Pat. No. 8,373,563, incorporated by reference herein. This patent relates to electronic tags (one example being RFID tags) attached to single growing plants and having the ability to read data about the plant or write to that tag, as desired.

FIG. 1 also illustrates the system 10 can communicate the reader 20 with a precision farming system 28. Such systems are known in the art and are available from a variety of manufacturers including the assignee of this application. An example is U.S. Pat. No. 9,043,096 to inventors Zielke et al. and assigned to Ag Leader Technology of Ames, Iowa (USA). Those systems can include programmable processors that can communicate with (to and from) a variety of different components and store and process data useful for agricultural production.

Therefore, at a general level, system 10 utilizes simulated seeds mimicking the form factor of actual seeds. The simulated seeds are co-mingled with the actual seed. Therefore, they can be processed like actual seed and, as such, their proximity to the actual seeds throughout an agricultural production cycle (e.g. from original packaging to planting to growing the plants in the field), can be available for automatic, fast, accurate interrogation nondestructively and in a contactless manner for a variety of purposes.

C. Simulated Seed

Figure 2A:
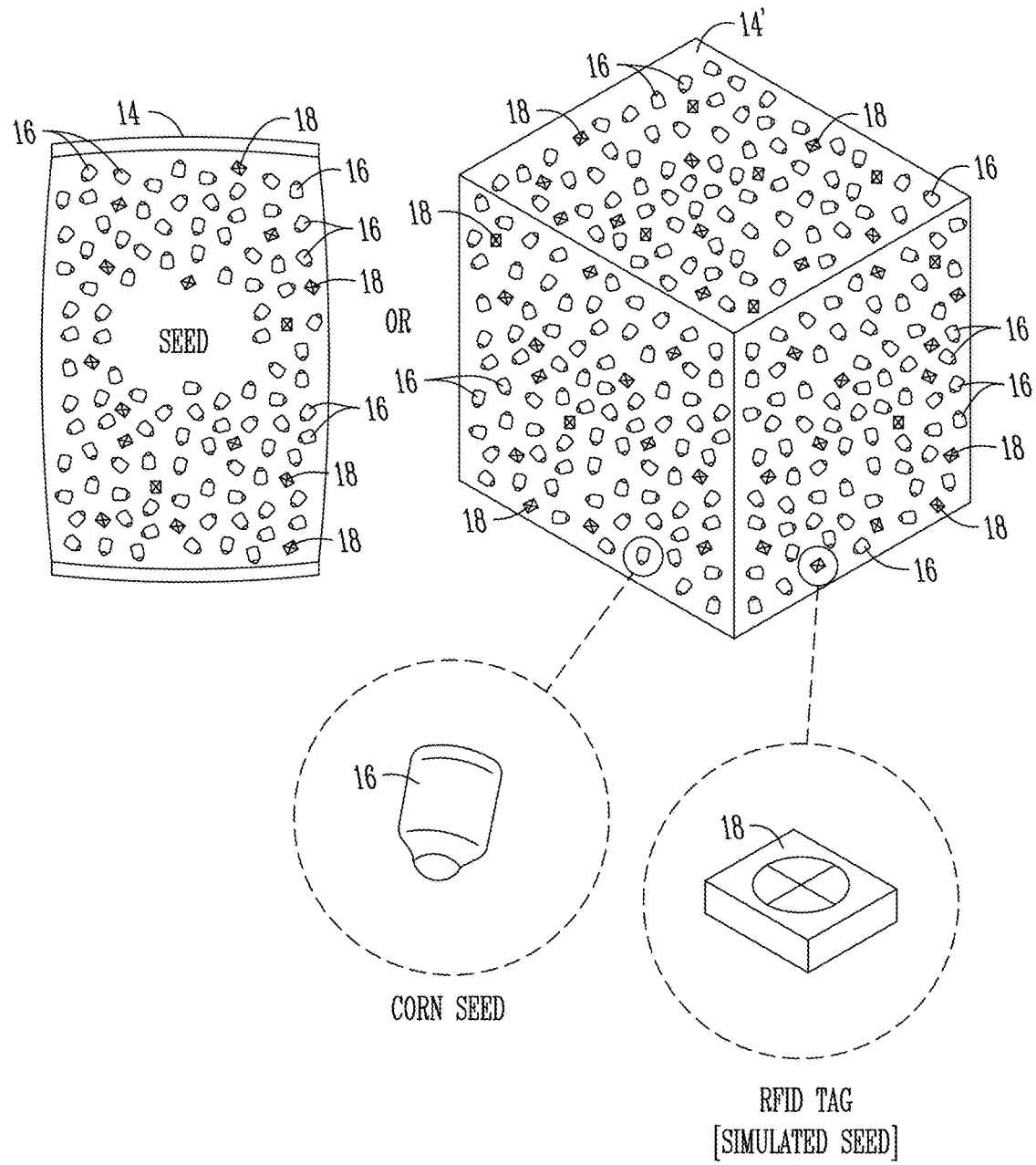
FIG. 2A shows diagrammatically several different forms of packaging of co-mingled simulated seeds and actual seeds (e.g. seed bag or seed box) and illustrating with symbols actual seeds (blank) with co-mingled simulated seeds (X's in middle).
Figure 2B:
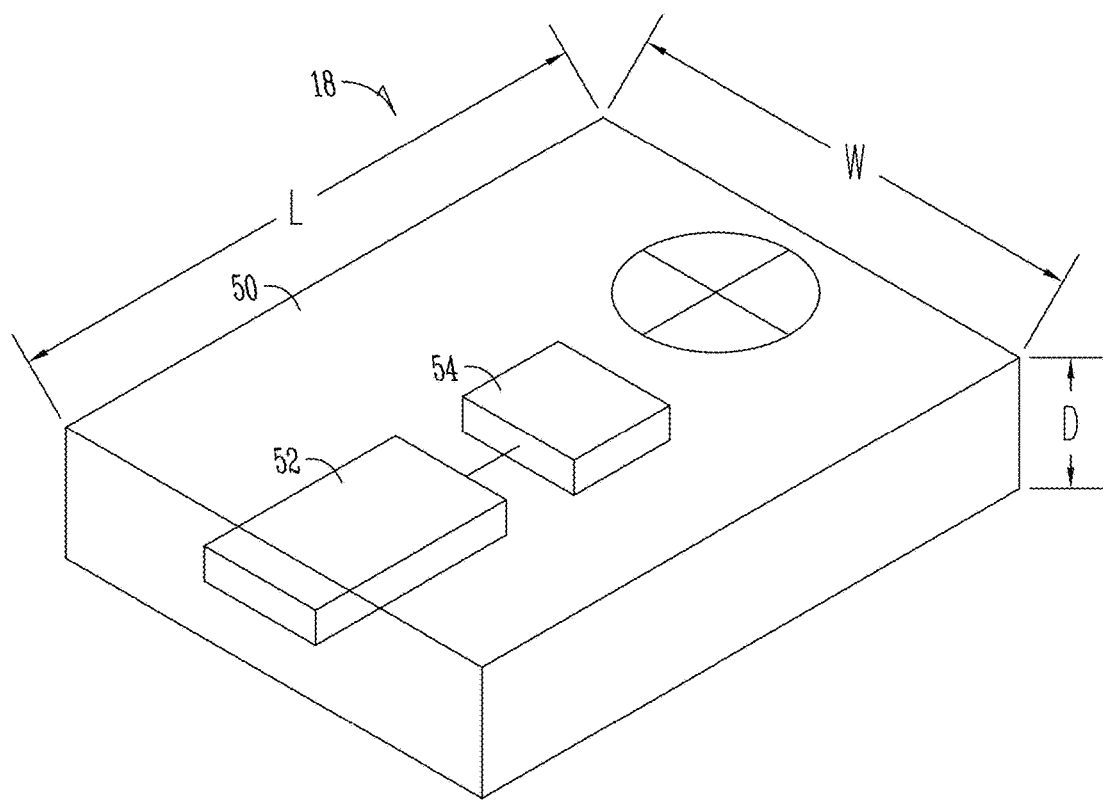
FIG. 2B is a greatly enlarged scale diagrammatic view of a single simulated seed comprising an RFID tag encapsulated in a body having a form factor that simulates the actual seed, in this example a corn seed.
Figure 2C:
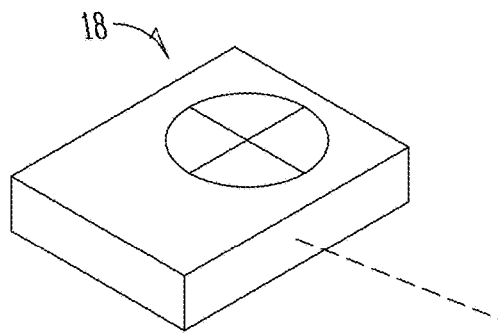
FIG. 2C is a diagrammatic view of examples of the type of RFID data that could be programmed into a simulated seed and available for reading.

By reference to FIGS. 2A-C, further details regarding one embodiment of simulated seed 18 are illustrated.

At least with reference to corn seed, a variety of packages are usually utilized by the seed producer and the commercial transaction between seed producer to end-user farmer. One example is a seed bag 14. A consistent predetermined quantity of actual seed kernels per bag is typical in such transactions.

In this embodiment, the pure actual seed of a bag would be replaced with a ratio of simulated seed 18 to actual seat 16. This is illustrated diagrammatically in FIG. 2A. This would be worked out with the seed production company prior to packaging. Techniques for adding simulated seed 18 in the desired ratio to actual seed can vary. In one example, the bag could be filled with actual seed 16 and then a quantity of simulated seed 18 to meet the desired ratio added without any mixing. It would be likely that during pouring of mixture 12 into a planter and/or metering the seed that a more random distribution of simulated seed would occur.

Alternatively, some stirring or shaking of bag 14 might promote more random distribution throughout bag 14. Or essentially metering of simulated seed during filling bag 14 could be used. A technique similar to the metering of simulated seed into flowing grain in a harvester, such as described in U.S. Pat. No. 8,810,406 is one example.

Alternative packaging is possible. One example is a seed box 14', such as is known in the art. It also could contain a quantity of a predesigned ratio of actual seed 16 the simulated seed 18.

Other packages or delivery modes are possible. For example, seed can be delivered in bulk. It is possible to do so with a pre-designed ratioed, co-mingled set 12 of actual and simulated seed 16/18.

FIG. 2A, and the enlargements therein, is intended to convey that the simulated seeds 18 are packaged in a form factor 50 (FIG. 2B) that mimics or at least approximates the form factor of the actual seed 16 at issue. By any of a number of materials and processing techniques, the basic form factor of actual corn seeds 16 can be mimicked. For example, exterior form factor (length, width, and depth L/W/D) and even peripheral curvatures or overall shape (corn tends to have a trapezoidal or wedge shape) can be made to mimic the somewhat asymmetrical or non-regular exterior shape of a corn seed.

For example, housing 54 of each simulated seed 18 could be made of plastic, glass, or other formable materials that could not that not only include the simulated form factor but also such things as weight, texture, coefficient of friction, and the like. The designer can select which characteristics are needed. All of the foregoing may not necessarily be needed to operate adequately at or through a planter. Further discussion of such seed simulation can be found at commonly-owned U.S. Pat. No. 8,810,406 to Ag Leader Technology, Inc., which is incorporated by reference in its entirety.

FIG. 2B diagrammatically illustrates that housing 50, in this embodiment, would encapsulate an RFID tag that would include an integrated circuit (IC 52) and antenna 54. Such RFID tags can be miniaturized and fit within a form factor simulating a corn seed. Examples include a variety of different types available commercially from vendors such as HID Global company of Austin, Tex. (USA) (see http://www.hidglobal.com/products/rfid-tags/identification-technologies for information on a variety of RFID tag characteristics including miniature, embeddable passive tags). They include RFID tags as small as on the order of a few millimeters or less length, width, thickness and which are compliant with well-known standards such as ISO standards. Data capacity for such tags can be several tens of bits to hundreds if not more (e.g. some are reported to have 3K digital storage). Therefore, a substantial amount of data can be stored or written to such RFID tags. Alternatively, some RFID tags simply carry and transpond a serial number or other identifier alone or that is essentially a key to access an off-chip database (e.g. over the internet or in the cloud) that could contain much more information.

The designer would select a specific RFID tag based on need or desire. Design factors could include such things as: (a) how far away the reader could accurately and reliably consistently read a simulated seed, including through barriers such as packaging, equipment, or planting depth in soil; (b) cost, (c) robustness, (d) ability to fit the desired form factor, (e) flows through a typical planter easily.

The literature reports passive RFID chips on the order of hundreds of millimeter length and width and such miniaturization is proceeding. The literature also reports passive RFID chips that have a readable range of about 10 m$^2$ (implying about three feet in any direction from the RFID tag). This may be sufficient for most, if not all, stages of crop production described in this example. It is known in the art that some stronger readers may be needed when trying to read tags that are located beneath the soil especially in wet conditions.

As is well-known, RFID tags can be passive, semi-active, or active and can be read-only or read and write. The designer would balance factors such as what features are needed for a particular application, cost, and it readability distance. Some types may not fit within the form factor needed for simulated seeds.

FIG. 2C illustrates diagrammatically examples of the type of data that could be preprogrammed into RFID tagged simulated seed 18. It could contain one or more of the data 58 shown in FIG. 1C. Examples include but are not necessarily limited to:
 a. RFID tag number;
 b. manufacturer name;
 c. hybrid/variety name;
 d. lot number;
 e. seeds/lb.;
 f. herbicide, pesticide, insecticide, or other crop usage restrictions;
 g. GDU (Growing Degree Units or other agronomy metrics, such as are well-known in the art);
 h. maturity;
 i. herbicide traits of the seed;
 j. insecticide traits of the seed;
 k. disease levels;
 l. refuse levels (including but not limited to plant and weed stems);
 m. date/time planted;
 n. other seed-specific details.

Of course, any one are more these types of data could be preprogrammed. At least in one aspect of the invention, at least hybrid or variety identifier would be utilized.

As illustrated in FIG. 2A, the co-mingled set of seed 12 can be pre-designed to have a specific ratio of simulated seed 18 to actual seed 16. With respect to seed corn, the following is are a couple of potential design choices.

The question of how many RFID tags the size of seeds to place in a bag of seed corn depends on what resolution of accuracy the farmer/information provider would want. Items in italics indicate how many tags would be needed to detect a variety change per bag of seed in relation to cost. Both scenarios show yield cost is not significant to the farmer and provides an idea of using 30 to 125 tags per bag of seed corn. The cost of the RFID tags will need to be considered on how many are used per bag. It may be that only a few RFID tags are used per bag. It all depends on the accuracy that needs to be achieved. This chart was made to be a guide to help understand the practical cost and implementation.

| Possible planting scenario option A | |
|---|---|
| 80,000 | kernels in a bag of seed corn |
| 32,000 | Plant population |
| 2.5 | ac per bag |
| 209 | inches per 1/1000th of an ac |
| 8.36 | inches per seed |
| 0.0125 | tags per 1/1000th of an acre |
| 1 | tag per every 1400 feet |
| 12.5 | tags per acre |
| 31.25 | tags per bag |
| 5 | bushel loss per tag in 1/100th of an acre |
| 0.0625 | bushel loss per acre |
| 4 | Price of corn |
| $ 0.25 | Cost per acre in yield loss. |
| Possible planting scenario option B | |
| 80,000 | kernels in a bag of seed corn |
| 32,000 | Plant population |
| 2.5 | ac per bag |
| 209 | inches per 1/1000th of an ac |
| 8.36 | inches per seed |
| 0.05 | tags per 1/1000th of an acre |
| 1 | tag per every 350 feet |
| 50 | tags per acre |
| 125 | tags per bag |
| 5 | bushel loss per tag in 1/100th of an acre |
| 0.25 | bushel loss per acre |
| 4 | Price of corn |
| $ 1.00 | Cost per acre in yield loss. |

As will be appreciated, such ratios are not necessarily required. One simulated seed 18 per package 14 may be sufficient for some purposes. However, if higher resolution inground and planted is desired, ratios in the general range described above are seen as a reasonable balancing of competing factors regarding cost and yield reduction.

The designer could work with either the seed production companies or the end producers for this ratio.

D. RFID Reader

A variety of commercially available readers exist. One example has been previously mentioned. Others are, of course, possible.

As will be appreciated, the reader must be compatible or configurable to read whatever RFID tag is selected for simulated seed 18. As indicated above, a variety of standards have been established both in the United States and elsewhere that allow understanding of compatibility on this point.

As will be further appreciated, the readers can vary in size and complexity. This can include the ability to just read an RFID tag versus read and write and other functionalities. This could include ability to have onboard processing and storage. It also could include ability for input from and output to other devices.

For example, some have an output that is compatible with other devices including other processors. Thus, reader 20 could communicate with a processor of a precision farming system. An example would be an output protocol or format like ISO 18000 or EPCglobal UHF class 1 Gen 2.

Others could have outputs or even two-way communication with remote devices like remote computers, clouds-based servers, or remote databases.

Furthermore, the designer could select a reader that has size, function, and robustness needed for placement and use in agricultural conditions ranging from seed storage locations to onboard exposed field-use equipment such as planters, sprayers, and harvesters. Handheld portable units, vehicle mounted (land and aerial) or other are also possible.

Robustness of RFID tags is possible for all of these purposes, including inground exposure to a wide variety of temperatures and moisture. Readers can be ruggedized and robust for these different uses.

E. System Operation

An example of operation of co-mingled seed 12 relative to field-based corn production is as follows.

As indicated in FIG. 2A, a seed production company can pre-package sets 12 of co-mingled actual and simulated seed 16/18 in a predetermined ratio in a package 14 or 14' (or other). An RFID reader 20 within operating range could read, in a contactless manner, the RFID data from simulated seed 18 in any such package (such as at a storage location or on a transport vehicle).

Simulated seed 18 can be preprogrammed to include at least one or more of the data 58 in FIG. 2C. More or different data is possible. See, e.g., other lists herein.

Figure 3:
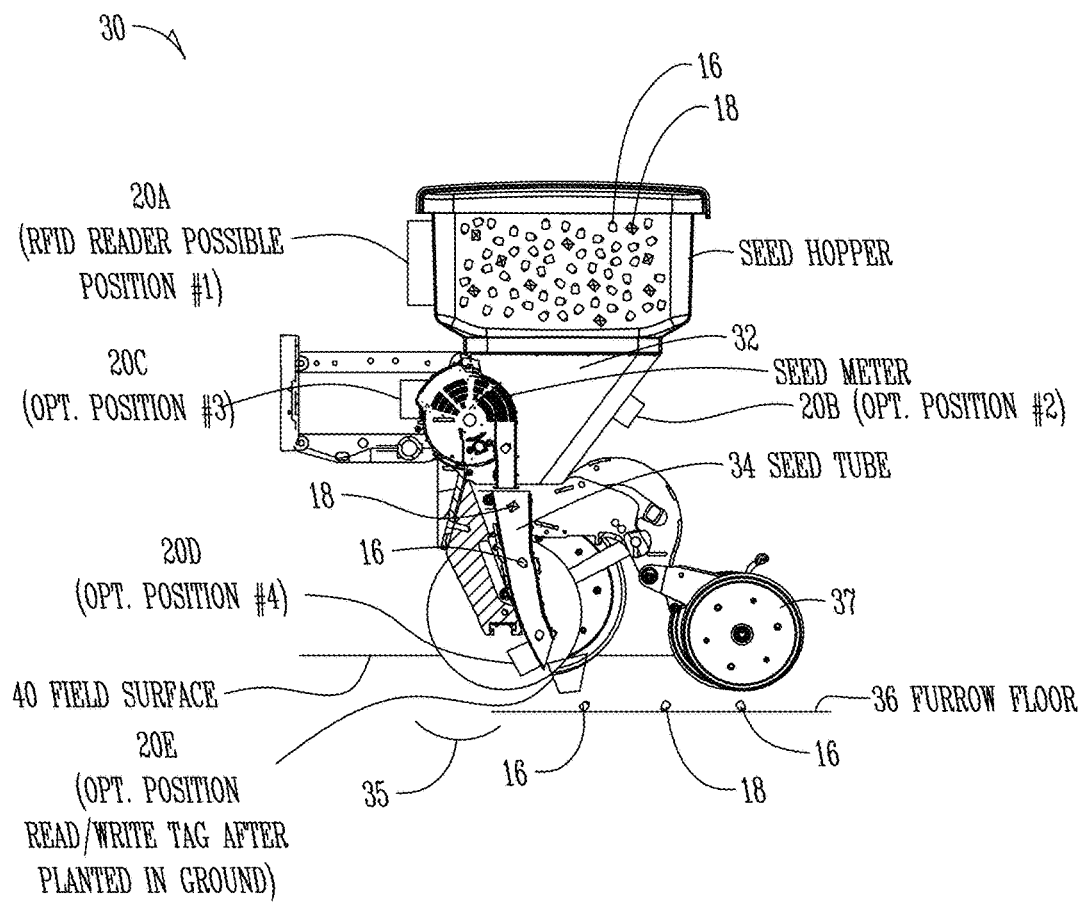
FIG. 3 is a diagrammatic view of simulated seed and actual seed at a corn planter row unit, illustrating optional alternative positions for RFID readers.

As indicated at FIG. 3, package 14 or 14' can be transported to a corn planter out at field 40 (see, e.g., planter 30 at field 40). Once container 14 is either at planter 30 or its contents poured into a seed hopper or holding space on planter 30, the reader 20 could confirm and record data from the simulated seeds 18.

FIG. 3 illustrates that an RFID reader could also or alternatively be placed in a variety of different locations on or at planter 30 (see, e.g., examples at ref nos. 20A-E in FIG. 3). Examples are at the onboard seed box 14' or seed hopper location; at the conveyance passage 32 between the bulk seed and seed meter 33; at seed meter 33, or perhaps along seed tube 34. Another (20E) is right when planted in the ground; reader 20E is carried on planter 30 at a location near where the seeds are deposited in the furrow. Other locations are possible.

Additionally, a reader and/or writer could be mounted at or integrated (as much as possible) with other devices. One example is a seed population sensor such as can be on a planter (e.g. at or near the seed tube) and which communicates seed spacing to, e.g., a precision ag system. Since it is already on the planter, the designer could add an RFID reader and/or writer and possibly share a housing, wiring harness, wireless transceiver, etc. Other such integrations with other meters, sensors, monitors, or on-board equipment are possible.

Figure 4:
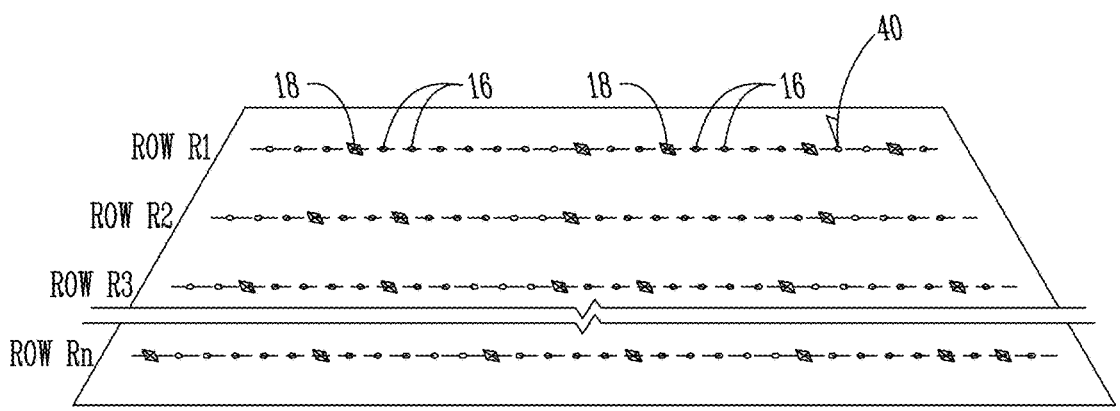
FIG. 4 is a highly reduced-in-scale diagram of a planted field illustrating one example of possible population of rows with actual versus simulated seeds.

As indicated, planter 30 has ground working tools 35 that create an inground furrow 36 for each row at field 40. Seed tube 34 would serially convey singulated actual/simulated seed 16/18 from seed meter 33 as planter 30 is moving in the field to serially deposit them in a manner diagrammatically illustrated in FIG. 4. As described above, statistically co-mingling of 16 and 18 would normally result in simulated seed 18 distributed roughly in the ratio to actual seed 16 along each row. The higher the ratio of 18 to 16 the more resolution and certainty of actual seeds being linked into simulated seeds 18.

Importantly, FIG. 3 illustrates how during planting, including switchover or reloading of planter 30 with new seed, could allow automatic and real-time sensing of the RFID information about the mixture 12 so that the farmer and/or a precision ag system is accurately and continuously informed and updated on the data carried on simulated seeds 18. This relieves the farmer from having to manually enter that information at each planter reloading or switch over of seed.

RFID tag technology allows a unique identifier for each tag. This could allow, if desired, each individual simulated seed 18 to have unique data. This could allow resolution of data about close proximity actual seeds 16 around each simulated seed. For example, this could allow resolution of unique information relative to field position down to sections of each row. Thus, spatially distinguishable data to that resolution could be used advantageously in such things as field mapping and precision farming.

On the other hand, it may be sufficient to simply automatically read the data from the simulated seeds during planting and confirm for the farmer or precision ag system what variety or hybrid is being planted. In that case, it may not be necessary to have very many simulated seeds 18 in each bag or container 14.

The other subtlety is that, once planted (see FIG. 4), a reader 20 can confirm the contents of the simulated seeds 18 even covered in the ground. An appropriate RFID tag and reader will have sufficient range to do so. As further indicated in FIG. 1, this remains true across the entire growing season. The simulated seeds 18 stay in the ground in their position as the seeds emerge and grow into plants.

Thus, from at the planter 30 during planting to harvesting of those plants, and even beyond (for as long as the RFID tags remain operable in the ground), those inground simulated seeds 18 can be read.

Is to be understood that because each RFID tag can have a unique identification, and/or RFID tags could be both readable and writable, the processing of the reader and/or precision ag system, for example, could distinguish between simulated seeds 18 planted and still inground in a prior growing season from those inserted into the ground in a present or future growing season. One example is simply at the time of planting writing to the RFID tags in the simulated seeds the date of planting. A reader or precision ag controller could filter out or ignore data from simulated seeds planted in a prior year from those in a present or future year even if they were basically in the same location in the field. Another example would be to use (if available) the unique serial numbers of RFID tags to distinguish between them, even if closely spaced.

Figure 5A:
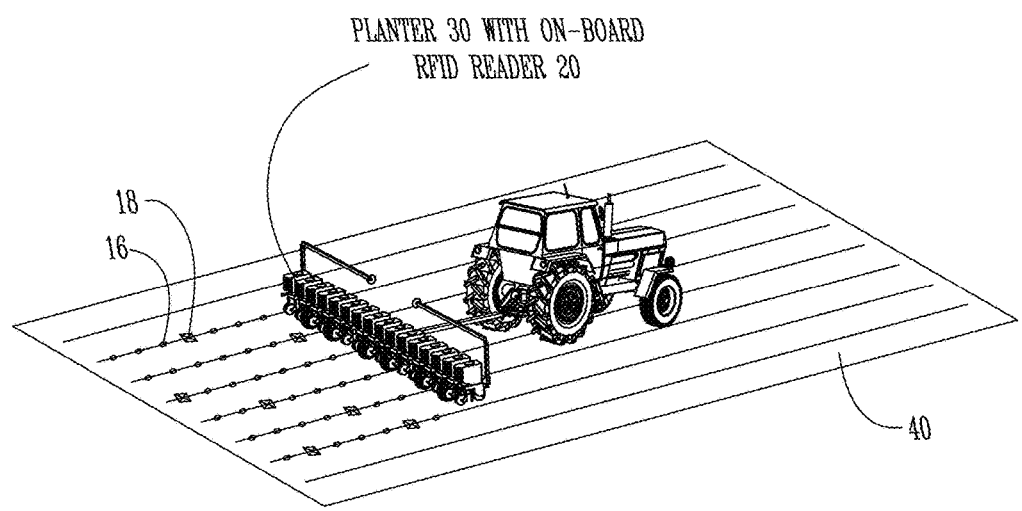
FIG. 5A is a highly diagrammatic reduced-in-scale depiction of a tractor that could include a precision agricultural system with a multi-row planter implement that plants co-mingled simulated and actual seed, and includes at least one reader of those simulated seeds at the planter.
Figure 5B:
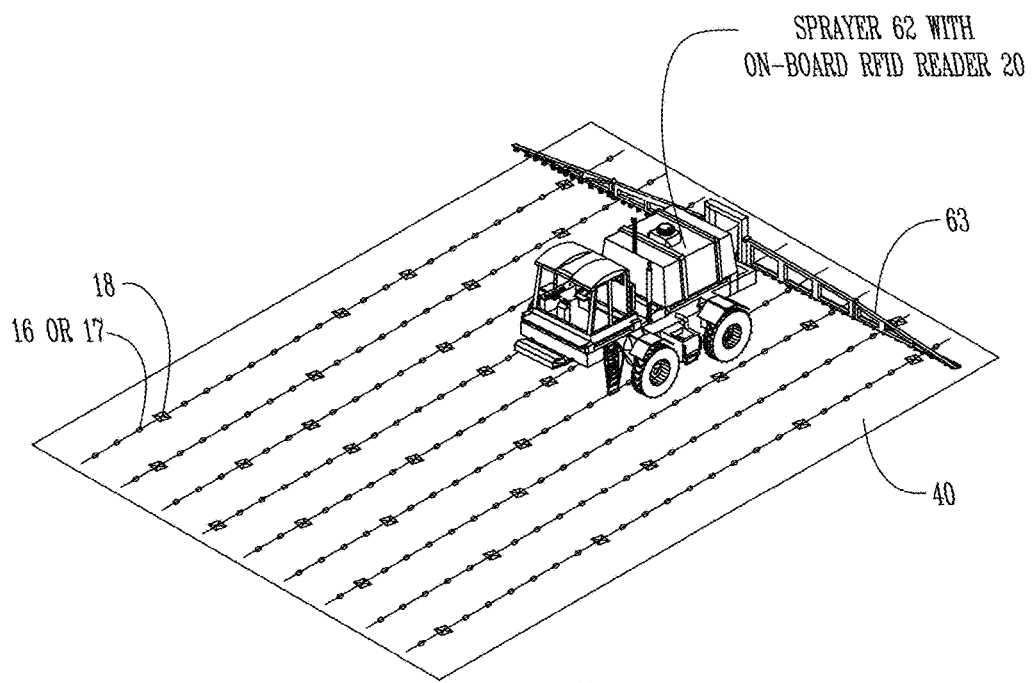
FIG. 5B is similar to FIG. 5A but shows, in a later pass after planting, a sprayer including a precision agricultural system and on-board reader(s) for the simulated seed that have been planted in the field.
Figure 5C:
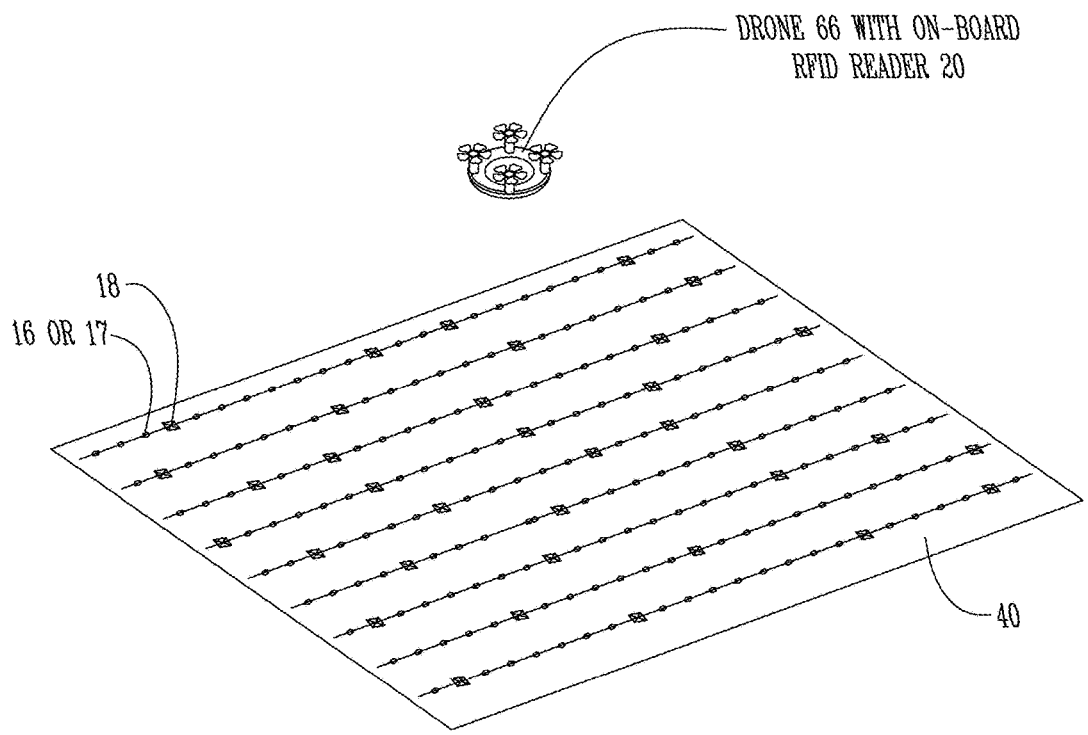
FIG. 5C is similar to FIG. 5B but shows, alternatively, a human with a handheld reader could scan areas of the field within its range and read information of planted simulated seed for purposes such as verifying hybrid or variety type that has been planted, and using such information for advice for that planting season or future planting seasons, or for other purposes.

FIGS. 5A-C illustrate examples of subsequent beneficial use of system 10 after planting.

FIG. 5A shows use of system 10 in a first pass through field 40. Planter 30 receives and plants co-mingled seed 12. Tractor or motive force 60 pulls planter implement 30. At least one reader 20 can be carried onboard to identify and/or record or store information read from or written to the simulated seeds 18 in the planting phase.

FIG. 5B shows a second or subsequent pass through field 40. For example, later in time after planting, motive force 62 with a sprayer system 63 could include a reader (one or more) 20. A precision farming system 28 carried on board sprayer 62 or otherwise could receive data from the reader about the inground planted simulated seed 18 and confirm that a certain spray is appropriate for either the hybrid or variety type of actual planted seed 16 and/or for that location in the field (or for growing conditions or other seed specific factors).

FIG. 5C shows, in the alternative, that an agronomist or trusted advisor 64 could take a handheld scanner 20, or perhaps carried in vehicle 65, and go to field 40 and verify the variety or hybrid type, or otherwise gather data stored on simulated seed 18 for purposes of advice for that growing season or future growing seasons. With appropriate equipment, advisor 64 could also write to the inground simulated seeds 18.

Figure 5D:
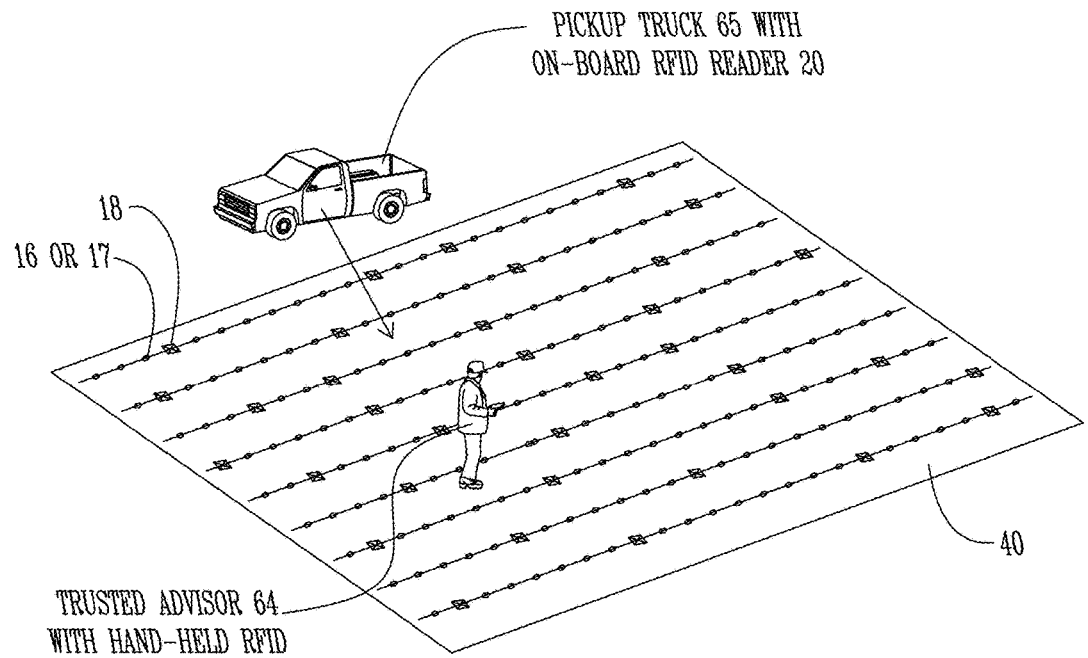
FIG. 5D illustrates diagrammatically the field of FIG. 5C with a drone with an on-board reader that could be used to scan part of or an entire field and read the information from simulated seed planted in that field.

FIG. 5D illustrates diagrammatically that a reader 20 could be placed on an aerial machine such as UAV drone 66 which could be manipulated relative to field 40. The designer would have to match appropriate RFID tags and readers with operational parameters of the drone to ensure, e.g., the drone could obtain accurate and reliable readings (e.g. from an acceptable range by drones at appropriate heights off ground level).

As can be appreciated, FIGS. 5A-D illustrate that not only can fast, real-time data reading from simulated seeds 18 can be correlated to actual seed 16, or merged with other data regarding agricultural production. For example, mapping of fields with resolution down to at or around each inground simulated seed 18 is possible. Examples of such mapping are described in U.S. Pat. No. 6,141,614 to inventors Janzen et al. and owned by Caterpillar Inc., Peoria, Ill. (USA), incorporated by reference herein.

F. Precision Farming System

Figure 6:
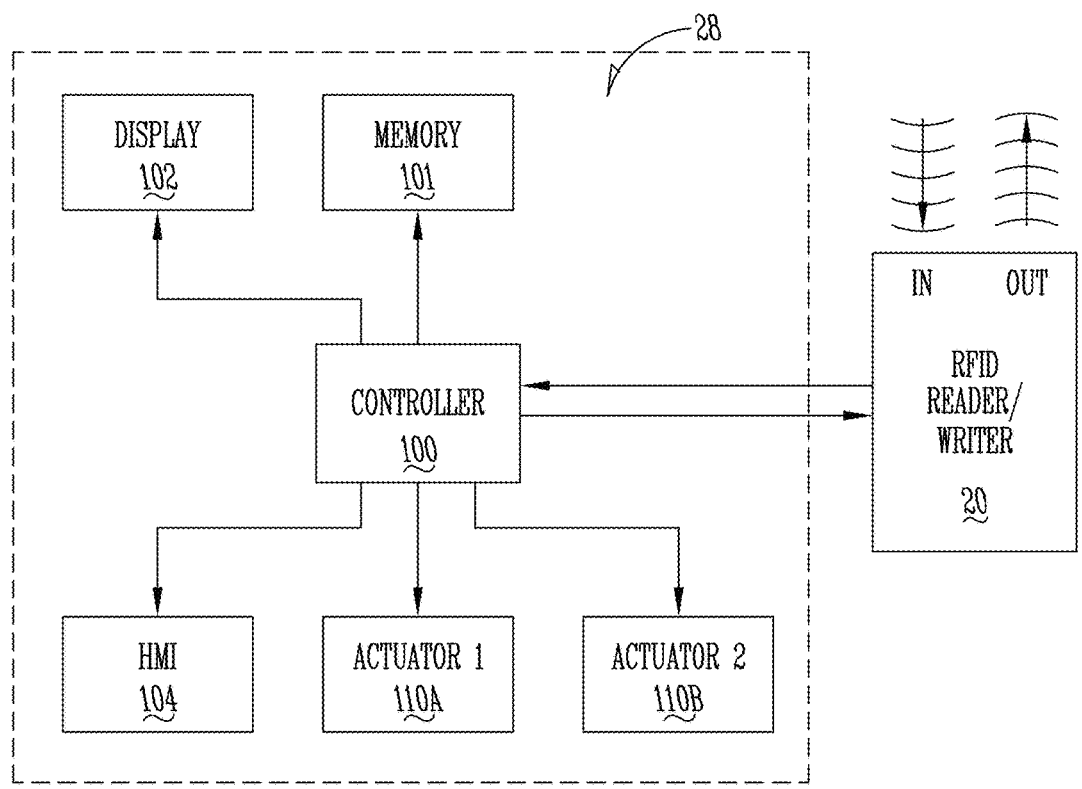
FIG. 6 is a block diagram illustration of integration of a reader for the simulated seed with RFID tags with a precision farming system.

FIG. 6 shows diagrammatically the interface of an RFID reader 20 configured to read and write to RFID-based simulated seeds 18 with a precision farming or ag system 28. Such systems are well-known and commercially available from a number of commercial vendors. These types of systems typically include a processor/controller 100 having memory 101, a user display 102, a human machine interface 104 (for data entry between operator and system 28). It can also include outputs to a variety of actuators 110A, 110B, etc. Those actuators could include automated vehicle steering, field mapping, vehicle speed, planting seed spacing, application rates or mixes, etc. A variety of inputs to the system can include geo-position as with GPS readings, other sensors such as temperature, soil moisture, etc. This allows a high degree of flexibility in utilization of seed specific data from system 10 readable from simulated seeds 18, both prior to planting and after planting.

It can therefore be seen that embodiments of the invention allow placing RFID or other contactless machine-readable tags or devices the size of seeds into packages such as seed bags or Pro-boxes so that when planting the crop it can detect which seed variety/brand is being planted. Embodiments may also include adding information to the machine-readable object or RFID tag. Examples of additional information can include but is not limited to:

a. planting date,
b. encryption so only certain people can read the tag,
c. what equipment planted it.

Other ag machinery/equipment can also read the tags including but not limited to sprayers, combines, drones, and trusted advisors.

It is to be particularly noted that the system can be configured to transfer data to the RFID tag during any field operation. With RFID this would involve the reader having read and write capabilities within range of the simulated seed to be written to. A non-limiting example is during planting operation. Information such as listed above could be added to the tag almost in real-time of events happening (e.g. planting date/time per simulated seed 18, what equipment planted it, geospatial particulars, environmental details, etc.). Non-limiting examples of other types of data that could be written to the RFID tags are mentioned elsewhere herein.

In the example of FIG. 5B, a third-party (or the farmer) spraying the farmer's field could include on the sprayer combination a system that detects what seed was planted to know what seed specific restrictions there may be (e.g. what herbicides are appropriate). Custom spraying applicators will spray customer fields and can occasionally spray the wrong herbicide in the field that does not have the corresponding herbicide resistance and therefore kill the entire field. Therefore, being able to confirm seed specific usage restrictions before spraying and deter such can be of great benefit.

Seed company representatives (including agronomists, sales people, etc.) can verify what seed was planted in the field to help diagnose issues. Seed company representatives rely on the farmer to tell them what hybrid was planted in which fields. Utilizing a reader 20 could help double-check and confirm seed-specific attributes to deter any such errors. Seed companies may also find this valuable in seeding research plots with seed varieties the change frequently.

Combine detection of what variety is being harvested based off of the RFID tags could also be advantageously used. For example, it can document what hybrid or varieties are being harvested by reading the inground simulated seeds as the equipment moves through the field. It could also be helpful for maintaining and distinguishing between such things as GMO versus non-GMO crops. Furthermore, with yield monitors, it could provide real time correlation between certain hybrids/varieties and yield for a given field and/or growing season. This could also assist in future planning of what hybrids/varieties to plan for future growing seasons.

G. Alternatives and Options

It will be appreciated by those skilled in the art that the invention can take a variety of forms and embodiments. Some non-limiting examples follow.

As indicated, simulation of seed size and form factor, and other characteristics, can be followed for different seeds types. Corn and soybeans are significant typical Midwest crops. The invention should can be applied in analogous ways to others seeds.

The materials for the simulated seeds 18 can vary. One potential optional feature could be a biodegradable simulated seed. Examples are discussed at Duroc, Y. and Kaddour, D., RFID *Potential Impacts and Future Evolution for Green Products*, Energy Procedia 18 (2012) 91-98. See also Davenport, C. J., Al-Azzawi, B., Novodorsky, P, and Rigelsford, J. M., *Biodegradable Passive RFID Tag for Subcutaneous Implant*, Progress in Electromagnetics Research Symposium Abstracts, Guangzhou, China, Aug. 25-27, 2014, page 1657. All of these are incorporated by reference herein.

Encryption of the data on simulated seeds 18 is possible. See, for example, U.S. Patent publication US 2005/0103840 to inventor Boles entitled "Anti-fraud Apparatus and Method for Protecting Valuables", incorporated by reference herein. This can alleviate concerns that non-authorized persons could surreptitiously read the simulated seeds and data associated with them. Such encryption could be applied originally as the seed is being planted. Access could be given to authorized users by the farmer by providing a password or encryption key. It could also be applied at any stage of processing, including but not limited to at planting, with a read-write system.

Encryption of an RFID tag could benefit the farmer so the farmer has the ability to be the only person who can read the tags without giving permission to others care. The farmer could have the ability to give encryption code others for their reading on a field-by-field basis. Encryption can be applied to the RFID tags when seed is being planted by using an RFID reader/writer.

Another example would be other types of data that could be written to the simulated seeds and/or correlated to them. Examples include but are not limited to:
a. field identifier;
b. planting date/time
c. planting equipment identifier;
d. ground speed;
e. climate conditions;
f. GPS position and row number (take into account ground speed and GPS to row unit placement offsets);
g. other operational values like fertilizer/application rates.

Design of mounting location for an RFID reader/writer can vary. Non-limiting examples relative a planter are:
a. to a seed tube or seed-carrying device;
b. between the seed meter and the ground on a planter row unit;
c. to a seed meter on a planter row unit;
d. to a bulk seed deliver hose of a planter/seeder;
e. to the bottom of a seed hopper of a planter/seeder;
f. to the bottom of bulk seed tank of a planter/seeder;
g. at or near where seed is deposited in the ground;
h. to a corn head, sprayer, or other type of agriculture machinery.

Reading and writing to RFID tags at the same time the system is planting or seeding is possible (as is the case also for other stages of the production cycle). One purpose of programming the tag with date/time it was planted allows the tag to be read in the future and the system will know when the tag was planted thus knowing what crop season it belongs to.

Monitors that map seed characteristics (e.g. population, singulation, down force, spacing errors, etc.) could use the system to read and record RFID tags so differing characteristics are mapped spatially correct with one display/system. The system can map GPS location, RFID number, hybrid/variety name, lot number, seeds/lb., crop usage restrictions, and other seed-specific details spatially. This can be important so that the user can reference these at another point in time. This information can also be exported from the precision ag system or display for other systems to read and interpret. Information could also be exported to the cloud for documentation and record keeping by the farmer or other authorized parties.

Instead of integration into a precision ag system, data from the reader could be integrated simply with a non-monitor (other digital device) that only logs the RFID's when they are sensed. It could optionally add a GPS input. This would be useful for farmers who do not utilize a high end precision ag display or system. Examples of other devices or locations to communicate reader information include but are not limited other digital devices (e.g. tablet computers, smart phones, and the like); local storage (RAM, ROM, solid state, etc.), cloud storage, etc.

Another example of an option or alternative is as follows. By appropriate programming, the system can automatically make and document certain assumptions. Take for example when a planter is planting and a tag is detected, the system can change the data that was previously logged to represent new information (e.g. new hybrid or variety) that was detected. If a farmer fills a planter with seed and starts planting, the planter might plant for a few minutes before the first tag is detected. At that time, there would be gap in the record as to seed-specific information (e.g. hybrid or variety type). However, the system should know or sense that the planter had been stopped (at the time and place of filling). By appropriate programming, the system could be instructed to assume that at that stop a seed refill occurred and back log the appropriate information about the refilled seed correctly. In effect, the system could back log that gap in the record based on that assumption to give a more complete logging of the field. Other assumptions or pre-programming are possible. Alternatively to using a pre-defined stop time to make the assumption and apply the back-logging, recognizing or sensing such things as weight of a seed hopper or central seed delivery system has increased could be used as the trigger for the back logging. Using this automatically sensed parameter, recognizing weight increase as opposed to time planter stopped, and using the point of time the first tag after that sensed parameter is detected, allows automatic back processing of logged seed/variety data (or other data). This feature could be made possible in many precision ag systems which sense or otherwise know such things as when the equipment starts and stops moving, or sense equipment parameters (including but not limited to weight).

Another possible option or alternative is as follows. Using the contactless reading of simulated seed planted in the ground, the system could be configured to spatially map where the tags were planted and spatially map any attribute or other information that was collected when reading the tag in a field operation (including but not limited to planting). The ability of precision ag systems and yield monitors and the like to create field maps, including with automatic georeferencing, is well-known. By appropriate programming of such intelligent, programmable systems, such a marrying or correlating of spatial and seed-specific information (or other information) can be done. This can occur at planting or in other operations.

What is claimed is:
1. A system for automatic verification of information about plantable or planted seeds comprising:
a. a co-mingled mixture of:
i. actual plantable or planted seeds of a given plant hybrid or variety; and ii. simulated seeds including contactless machine-readable data specific to the actual plantable or planted seeds of the given plant hybrid or variety;
b. a reader configured to automatically identify and data capture the machine-readable data from any of the simulated seeds:
  i. for plantable seeds the reader operatively mounted on one of:
    1. a plantable seed container; and
    2. a planter;
  ii. for planted seeds the reader operatively mounted on one of:
    1. an agriculture implement or motive force; and
    2. a precision farming device;
c. so that quick and accurate verification of the seed-specific data can be automatically obtained before the co-mingled mixture is planted, during planting, or in the ground after planting.

2. The system of claim 1 wherein the actual seeds are corn seeds and the simulated seeds comprise a housing which simulates one or more of an actual corn seed in:
a. length,
b. width,
c. thickness,
d. weight;
e. texture,
f. form factor.

3. The system of claim 2 wherein the actual seeds are soybean seeds and the simulated seeds comprise a housing which simulates one or more of an actual soybean seed in:
a. length,
b. width,
c. thickness,
d. weight;
e. texture,
f. form factor.

4. The system of claim 1 wherein the simulated seed comprises an RFID tag having the contactless machine-readable data.

5. The system of claim 4 wherein the RFID tag comprises:
a. a passive RFID tag; and
b. a miniaturized form to fit in the simulated seed.

6. The system of claim 4 wherein the machine-readable data comprises one or more of:
a. seed variety or hybrid identification;
b. RFID tag number;
c. lot number;
d. seeds/lb.;
e. crop usage restrictions;
f. growing degree units;
g. maturity;
h. date/time planted;
i. herbicide traits;
j. insecticide traits;
k. disease levels;
l. refuse levels.

7. The system of claim 4 wherein the RFID tag is readable and writable.

8. The system of claim 7 wherein the reader is a RFID reader having:
a. read and/or write capabilities;
b. a controllable interrogation zone and range at least on the order of several feet.

9. The system of claim 8 wherein the reader includes one or more of:
a. connectability to one or more other devices;
b. network connectivity;
c. a cloud connection;
d. an enterprise management capability;
e. a precision farming intelligent controller;
f. a mobile device including a tablet or phone; and
g. a local storage including a device or card.

10. The system of claim 9 further comprising:
a. the agricultural implement or motive force on which the reader is mounted is movable through a field;
b. the precision farming device is in operative communication with the reader;
the reader is mounted to the planter or
  a component on the planter such as a seed population sensor with which the reader is integrated.

11. A method for verification of crop variety or hybrid type of plantable or planted seed comprising:
a. co-mingling a quantity of an actual variety or hybrid type of seed and a quantity of simulated seed carrying contactless machine-readable data specific to the variety or hybrid type of seed;
b. reading the contactless machine-readable data at one or more times or locations between the co-mingling and harvest during a growing season;
c. so that variety or hybrid type, or other data or attributes, can be automatically verified at any of said one or more times or locations before the co-mingled mixture is planted, during planting, or in the ground after planting.

12. The method of claim 11 wherein the co-mingling comprises a pre-determined ratio of actual seed to simulated seed.

13. The method of claim 12 wherein the ratio is based on one or more of the following factors:
a. cost of the simulated seed;
b. effect on yield of planted seeds;
c. resolution of reading relative to planted seeds in a field; and
d. cost of electronic tags.

14. The method of claim 13 wherein for corn seed the ratio is on the order of:
a. 30 to 125 simulated seed per 80,000 actual corn seed.

15. The method of claim 14 wherein the mixture is packaged in a container.

16. The method of claim 15 wherein the container comprise a bag or box.

17. The method of claim 11 wherein the reading is of the mixture prior to planting.

18. The method of claim 11 wherein the reading is at filling a planter at a planting time at a field or during a planting operation.

19. The method of claim 11 wherein the reading is after the mixture has been planted in a field and either prior to germination, after germination but before emergence, or after emergence as a plant.

20. The method of claim 11 wherein the reading is from planted seed in the ground during harvest.

21. A method for in-field automatic identification of planted seed or plants emerged from planted seed comprising:
a. providing a plantable mixture of a predetermined ratio of:
  i. actual seed of a given hybrid or variety;
  ii. simulated seed carrying contactless machine-readable data related to the actual seed;
b. planting the mixture in a field so that actual seed are distributed relative to simulated seed at least roughly in spatial proportion to the ratio of actual seed to simulated seed;

c. automatically reading the machine-readable data of at least one planted simulated seed in the ground at a time between the planting and after harvesting plants grown from the actual seed;
d. correlating at least some of the machine-read data from a simulated planted seed with planted actual seed or plants grown from the planted actual seed within a proximity of the machine-read simulated seed, the proximity being related to the predetermined ratio of actual to simulated seed;
e. so that in-field automatic identification of planted seed or plants therefrom can be derived.

22. The method of claim 21 wherein the machine-readable data is stored on an RFID tag associated with the simulated seed and the reader is an RFID reader.

23. The method of claim 22 further comprising communicating the automatic reading of machine-readable data from the reader to another digital device.

24. The method of claim 23 wherein the another digital device comprises:
a. a precision agricultural system;
b. a computer;
c. a server;
d. a mobile device including tablet or phone; or
e. a cloud connection.

25. The method of claim 24 further comprising using the communicated automatic reading for at least one of:
a. controlling a field operation relative the planted seeds or plants therefrom;
b. making agronomic decisions about the planted seeds or plants therefrom;
c. making agronomic decisions for future plantings of the field; and
d. sharing the reading with other companies or trusted advisors.

26. The method of claim 21 wherein transferring in virtually real-time additional data to the machine-readable data during a planting operation.

27. The method of claim 26 wherein the additional data comprises one or more of:
a. field identifier;
b. planting date/time;
c. planting equipment identifier;
d. ground speed
e. climate conditions;
f. GPS position.

28. The method of claim 26 further comprising automatically correlating and logging spatial information with the additional information.

29. The method of claim 26 wherein the additional information relates to attributes about the planted seed.

30. The method of claim 26 further comprising:
a. sensing a parameter related to a planter refilling; and
b. automatically back logging information about the planting between the time or place of the planter refilling and the first read simulated seed after the time or place of refilling.

* * * * *